(12) United States Patent
Fester (10) Patent No.: US 7,708,789 B2
(45) Date of Patent: May 4, 2010

(54) VACUUM CLEANER WITH CYCLONIC DIRT SEPARATION AND BOTTOM DISCHARGE DIRT CUP WITH FILTER

(75) Inventor: Joseph A. Fester, Ada, MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 813 days.

(21) Appl. No.: 10/595,479

(22) PCT Filed: Dec. 21, 2004

(86) PCT No.: PCT/US2004/034841

§ 371 (c)(1),
(2), (4) Date: Dec. 11, 2006

(87) PCT Pub. No.: WO2005/041739

PCT Pub. Date: May 12, 2005

(65) Prior Publication Data

US 2007/0084158 A1 Apr. 19, 2007

Related U.S. Application Data

(60) Provisional application No. 60/481,542, filed on Oct. 22, 2003.

(51) Int. Cl.
*B01D 45/12* (2006.01)

(52) U.S. Cl. .......................... 55/337; 55/426; 55/429; 55/459.1; 55/486; 55/DIG. 3; 15/350; 15/353

(58) Field of Classification Search ............... 55/337, 55/424, 426, 429, 459.1, 486, DIG. 3; 15/350, 15/353
See application file for complete search history.

(56) References Cited

U.S. PATENT DOCUMENTS

| 5,230,722 A | 7/1993 | Yonkers et al. | |
|---|---|---|---|
| 6,070,291 A | 6/2000 | Bair et al. | |
| 7,152,275 B2 * | 12/2006 | Hitzelberger et al. | 15/352 |
| 2002/0178702 A1 * | 12/2002 | Oh | 55/337 |

FOREIGN PATENT DOCUMENTS

| EP | 0885585 A | 12/1998 |
|---|---|---|
| GB | 2402636 B | 7/2005 |
| GB | 2407261 B | 9/2005 |
| WO | WO97/12660 A | 4/1997 |

* cited by examiner

*Primary Examiner*—Robert A Hopkins
(74) *Attorney, Agent, or Firm*—McGarry Bair PC (57) ABSTRACT

A vacuum cleaner with cyclonic dirt separation and a bottom discharge dirt cup beneath the cyclone separator and a filter beneath the dirt cup and between the dirt cup and a suction motor inlet. A separator plate separates the cyclone separator from the dirt cup. Fins project from a sidewall of the dirt cup, and fingers projecting from a bottom wall of the dirt cup. A hollow standpipe in the dirt cup transports working air from the cyclone separator outlet to the filter.

28 Claims, 6 Drawing Sheets

VACUUM CLEANER WITH CYCLONIC DIRT SEPARATION AND BOTTOM DISCHARGE DIRT CUP WITH FILTER

CROSS-REFERENCE TO RELATED APPLICATIONS

This application claims priority on International Application No. PCT/US2004/034841, filed Oct. 21, 2004, which claims the benefit of U.S. Provisional Patent Application 60/481,542, filed Oct. 22, 2003, both are incorporated herein in their entirety.

BACKGROUND OF THE INVENTION

1. Field of the Invention

The invention relates to suction cleaners, and in particular to a separator for a suction cleaner. In one of its aspects, the invention relates to a separator with a cyclonic airflow path to separate dirt and debris from air drawn into the cleaner. In another of its aspects, the invention relates to a separator that deposits the dirt and debris in a collection receptacle. In another of its aspects, the invention relates to a bottom discharge dirt-collecting bin with an integrated filter chamber. In another of its aspects, the invention relates to a separator including structure for inhibiting the re-entrainment of debris that vacillates with upward airflows in the collection receptacle.

2. Description of the Related Art

Cyclone separators are well known. Some follow the textbook examples using frusto-conical shape separators and others use high-speed rotational motion of the air/dirt to separate the dirt by centrifugal force. Typically, working air enters and exits at an upper portion of the cyclone separator as the bottom portion of the cyclone separator is used to collect debris. Furthermore, in an effort to reduce weight, the motor/fan assembly that creates the working air flow is typically placed at the bottom of the handle, below the cyclone separator. This arrangement therefore, requires a tortuous air path from the top of the cyclone assembly, down the handle to the inlet of the motor/fan assembly. This creates a long air path with multiple parts which may allow for air leaks and generally negatively impacting airflow and, necessarily, cleaning performance.

Conrad et al., in U.S. Pat. No. 6,129,775 discloses a cyclone separator with at terminal insert which can take a number of forms. In FIG. 14(d), the terminal insert may comprise a plurality of longitudinally extending members (such as rods), which extend upwardly into the cyclone separator cavity from the bottom surface of the cyclone separator. The rods are said to interact with circulating fluid 48 to disrupt its rotational motion. The rods may be positioned symmetrically non-symmetrically around longitudinal axis of the separator. The rods may be a variety of shapes such as, in transverse section, squares, ellipses or other closed convex or abode shapes. Further, the transverse section of rods may vary longitudinally.

BISSELL Homecare, Inc. presently manufactures and sells in the United States an upright vacuum cleaner that has a cyclone separator and a dirt-collecting bin or dirt cup. A horizontal plate separates the cyclone separator from the dirt cup. The air flowing through the cyclone separator passes through an annular cylindrical cage with baffles and through a cylindrical filter before exiting the cyclone separator at the upper end thereof. The dirt cup has three finger-like projections extending upwardly from the bottom thereof to agglomerate the dirt in the dirt cup. The dirt cup further has a pair of radial fins extending inwardly from the side walls of the dirt cup. The dirt cup and the cyclone separator is further disclosed in the co-pending U.S. patent application Ser. No. 10/058,514, filed Jan. 28, 2002, and published as US20040154126 which is incorporated herein by reference.

U.S. Pat. No. 6,070,291 to Bair et al. and its progeny attempts to solve the efficiency problem by shortening the air path from the cyclone exhaust to the motor inlet. These patents disclose a pleated main filter element in a cyclonic chamber whereby exhaust air is drawn through the main filter through the bottom of the cyclonic chamber, through a secondary filter and directly into the motor/fan inlet. The motor/fan assembly is in a vertical position below the cyclone which is undesirable due to the amount of space needed at the bottom of the handle.

U.S. Pat. No. 6,341,404 to Salo et al. discloses a bottom discharge cyclone chamber with the motor/fan assembly mounted horizontally below the cyclone chamber. However, motor exhaust air is redirected back up towards the bottom of the cyclone chamber where it exits the unit through a cylindrical filter in a radial fashion. This path introduces a number of turns which tends to create backpressure and therefore reduce efficiency.

U.S. Pat. No. 4,593,429 to Dyson discloses a two stage cyclonic separator in a vacuum cleaner with a standpipe that extends from the outlet of a secondary cyclone separator through a bottom wall of a removable dirt cup. Air in a secondary cyclone separator exits the secondary cyclone through the standpipe to a vacuum source

SUMMARY OF THE INVENTION

A vacuum cleaner comprises a housing defining a cyclonic airflow chamber for separating contaminants from a dirt-containing airstream, the housing further comprising a cyclonic chamber inlet and an airstream outlet in fluid communication with the cyclonic airflow chamber, a nozzle housing including a suction opening, the suction opening being fluidly connected with said cyclonic chamber inlet, an airstream suction source fluidly connected to the suction opening and to the cyclonic airflow chamber for transporting dirt-containing air from the suction opening to the cyclonic airflow chamber, the suction source being adapted to establish and maintain a dirt-containing airstream from the main suction opening through said cyclonic chamber inlet and to the airstream outlet, a dirt-collecting bin mounted to the housing adjacent the cyclonic airflow chamber and in communication therewith to receive dirt separated from the airstream in the cyclonic airflow chamber, and a hollow standpipe extending through the dirt-collecting bin, in communication with the airstream outlet of the cyclonic airflow chamber and extending through a wall in the dirt collecting bin. According to the invention, a filter chamber is mounted to the dirt-collecting bin and has an inlet opening in communication with the standpipe to remove fine particles in the airstream that passes through the airstream outlet in the cyclonic airflow chamber.

In one embodiment, the filter chamber and the dirt-collecting bin are removably mounted to the housing for selective removal therefrom. In yet another embodiment, the filter chamber is integral with the dirt-collecting bin whereby both the dirt-collecting bin and filter chamber are selectively removable together from the housing.

In an alternate embodiment, a separator plate is positioned between the cyclonic airflow chamber and the dirt-collecting bin and separates the cyclonic airflow chamber from the dirt-collecting bin, the separator plate having a diameter less than a diameter of the cyclonic airflow chamber adjacent the separator plate to define a gap between the separator plate and the cyclonic airflow chamber for passage of dirt separated from the dirt-containing airstream in the cyclonic airflow chamber. In one embodiment, the dirt-collecting bin is below the cyclonic airflow chamber. In still another embodiment, the dirt-collecting bin wall is positioned in a lower portion of the dirt-collecting bin.

In still another embodiment, the standpipe is centrally located in the dirt-collecting bin and the airstream suction source is positioned in the housing below the filter chamber and has an inlet opening in communication with the filter chamber to draw the airstream through the filter chamber. The filter chamber can also include a filter that is removably mounted within the filter chamber, and optionally, the removable filter is cylindrical and the airstream passes radially through the cylindrical filter between the inlet opening in the filter chamber and an outlet opening in the filter chamber.

In accordance with one embodiment of the invention, the cylindrical filter comprises at least one of a foam filter and a pleated filter. In one embodiment, the air stream passes through the cylindrical filter between the inlet opening in the filter chamber and an outlet opening in the filter chamber. The cylindrical foam filter can be annular so that the air stream passes radially through the filter or can be solid so that the air stream passes axially through the filter.

Further according to the invention, a cyclone separator module comprises a housing defining a cyclonic airflow chamber for separating contaminants from a dirt-containing airstream with a cyclonic chamber inlet and an airstream outlet, each in fluid communication with said cyclonic airflow chamber. A dirt-collecting bin is mounted to the housing adjacent said cyclonic airflow chamber in communication therewith to receive dirt separated from the airstream in the cyclonic airflow chamber. A hollow standpipe extends through the dirt-collecting bin in communication with the airstream outlet of the cyclonic airflow chamber and extends through a wall in the dirt collecting bin. A filter chamber is mounted to the dirt-collecting bin has an inlet opening in communication with the standpipe to remove fine particles from the airstream that passes through the airstream outlet in the cyclonic airflow chamber.

DESCRIPTION OF THE PREFERRED EMBODIMENT

Figure 1:
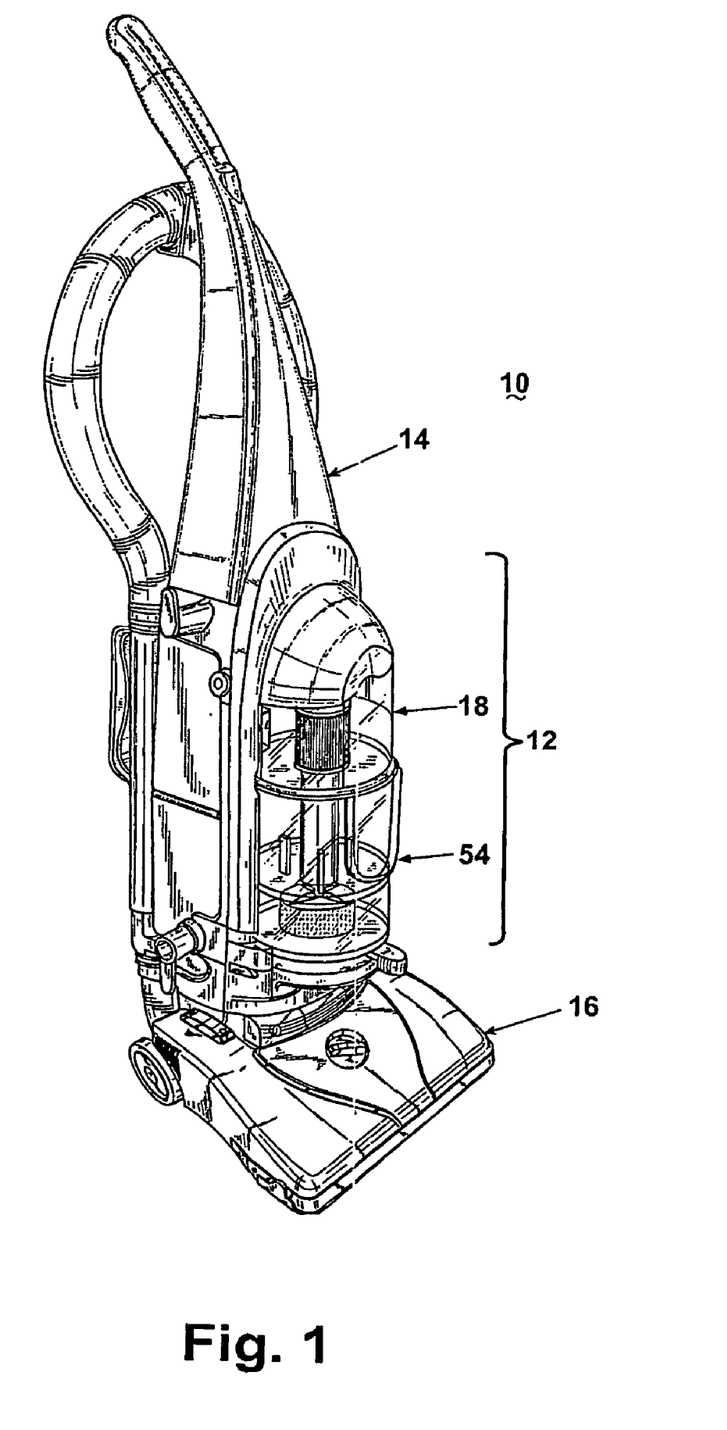
FIG. 1 is a perspective view of an upright vacuum cleaner with cyclone separator according to the invention.
Figure 2:
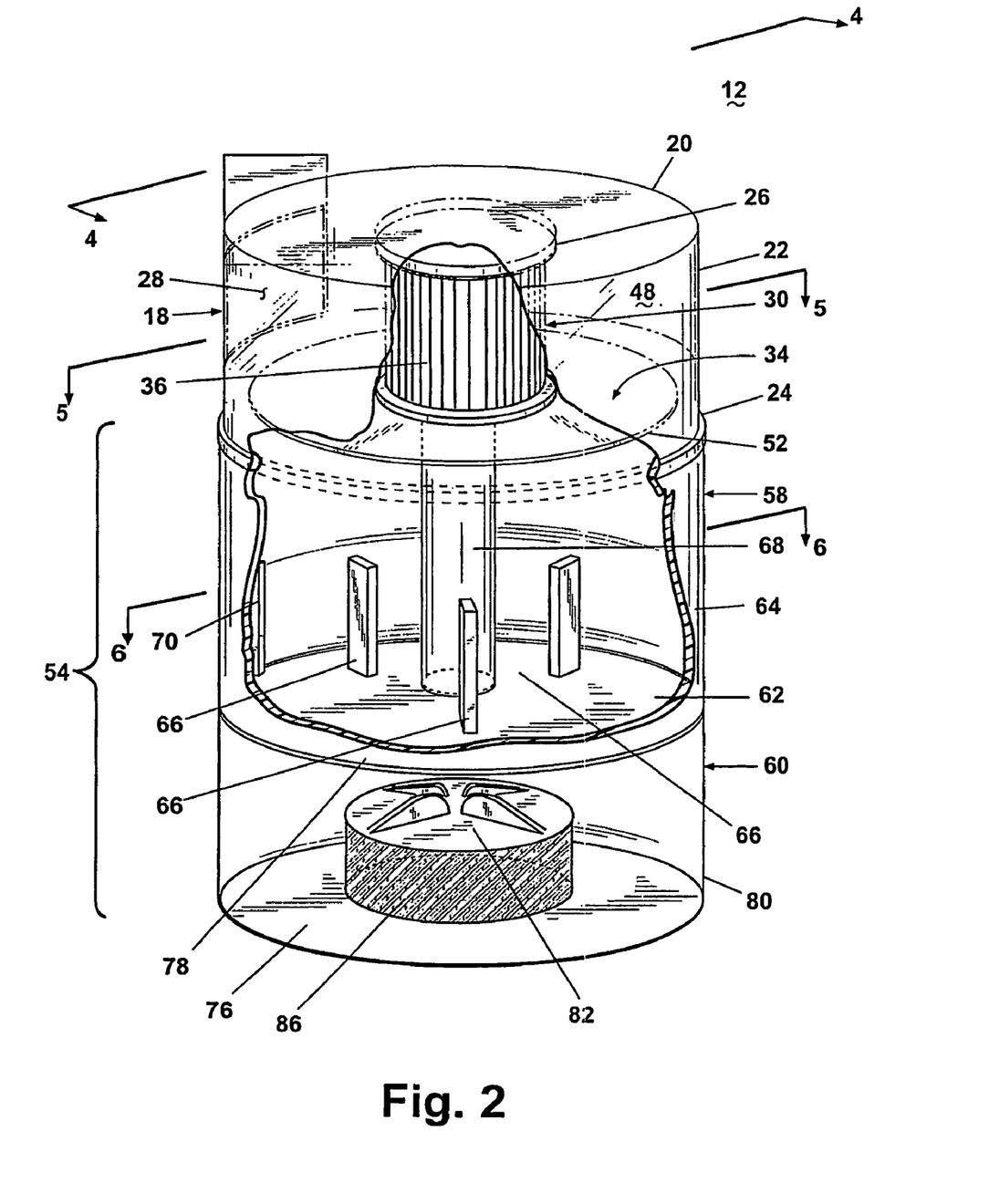
FIG. 2 is a cut-away perspective view of the cyclonic separator of FIG. 1.

An upright vacuum cleaner 10 with cyclonic dirt separator and dirt cup assembly 12 according to the invention is shown in FIG. 1, comprising an upright handle 14 pivotally mounted to a nozzle base 16. The upright handle 14 mounts the cyclonic dirt separator and dirt cup assembly 12 according to the invention. The nozzle base has a conventional suction opening beneath a forward portion of the base. Referring to FIG. 2, the cyclonic dirt separator and dirt cup assembly 12 comprises a cylindrical cyclone separator 18 having an upper wall 20 and a sidewall 22, the sidewall 22 terminating in a lower offset lip 24. An annular collar 26 depends from the upper wall 20, the collar 26 and is centered in the cylindrical cyclone separator 18. The sidewall 22 further includes a tangential air inlet 28 aligned proximate the upper wall 20 for generating a tangential airflow in the separator 18 parallel to the upper wall 20 and forms an inlet opening in a cyclonic airflow chamber formed by the sidewall 22 and the upper wall 20. The cyclone separator 18 further comprises an exhaust assembly 30 forming an outlet opening to the cyclonic separation chamber.

The exhaust assembly 30 comprises a hollow cylindrical louver cage 32 mounted on a separator plate 34. The louver cage 32 further comprises a plurality of louvers 36 cylindrically arranged between a top portion of the louver cage 32 and the separator plate 34. A working air path is defined through the louver cage 32 and through a centrally located aperture on the separator plate 34. The louver cage 32 and separator plate 34 are removably mounted on the annular collar 26 on the upper wall 20 of the cyclone separator 18 via a friction fit. However, other mechanical fastening means can be used to removably mount the exhaust assembly 30 to the upper wall 20.

For example, one quarter turn bayonet fasteners, ramped threads, detents, or any other commonly known fastening method can be used according to the invention.

Also in this manner, a toroidal chamber 48 is defined between the cylindrical arrangement of louvers 36 and the sidewall 22, and between the upper wall 20 and the separator plate 34, respectively. In the preferred embodiment, the air inlet 28 is vertically aligned between the upper wall 20 and the separator plate 34 such that the tangential airflow generated from the tangential air inlet 28 is directed into the toroidal chamber 48.

Figure 3:
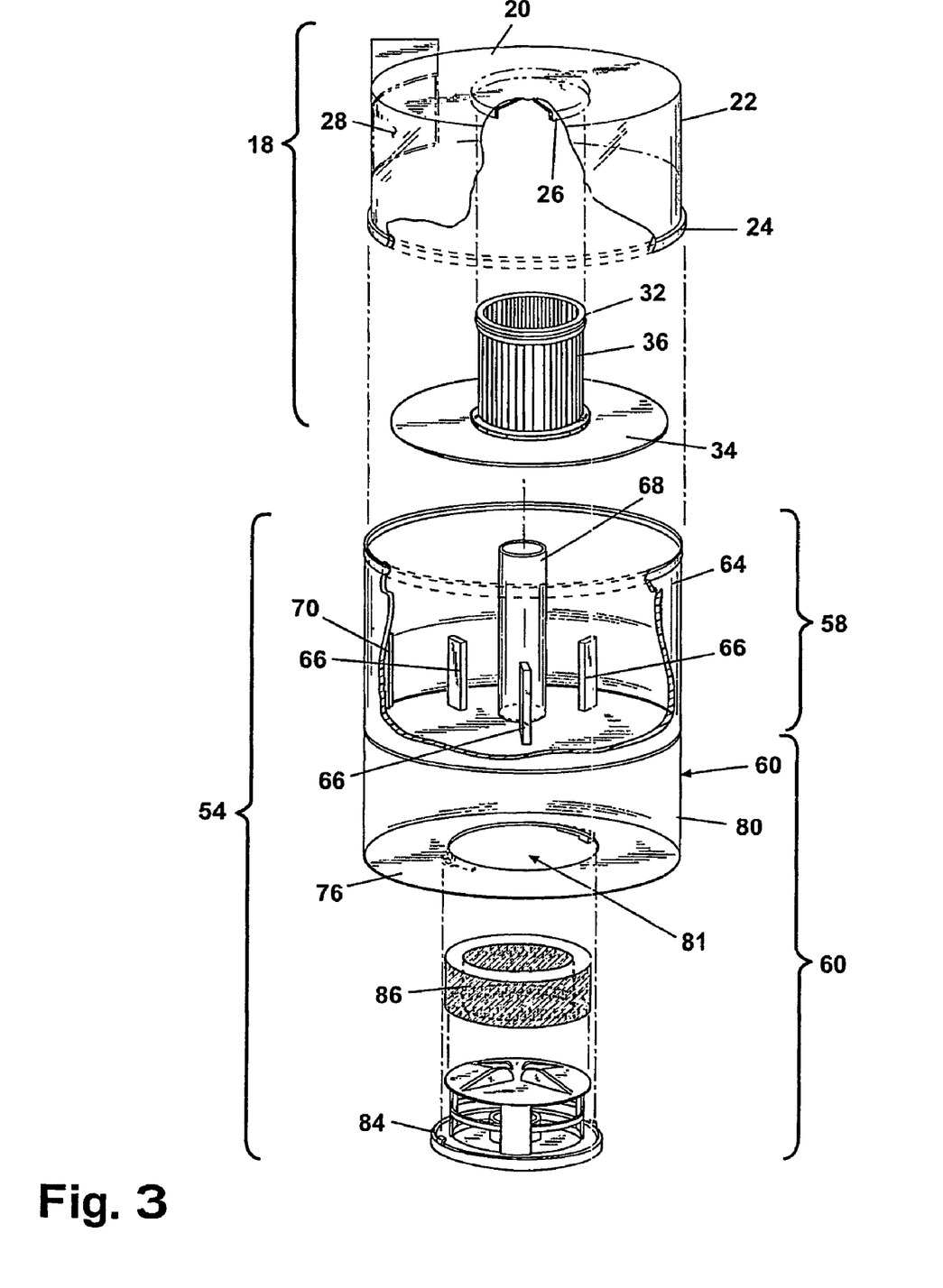
FIG. 3 is a cut-away exploded perspective view of the cyclonic separator of FIG. 1.
Figure 4:
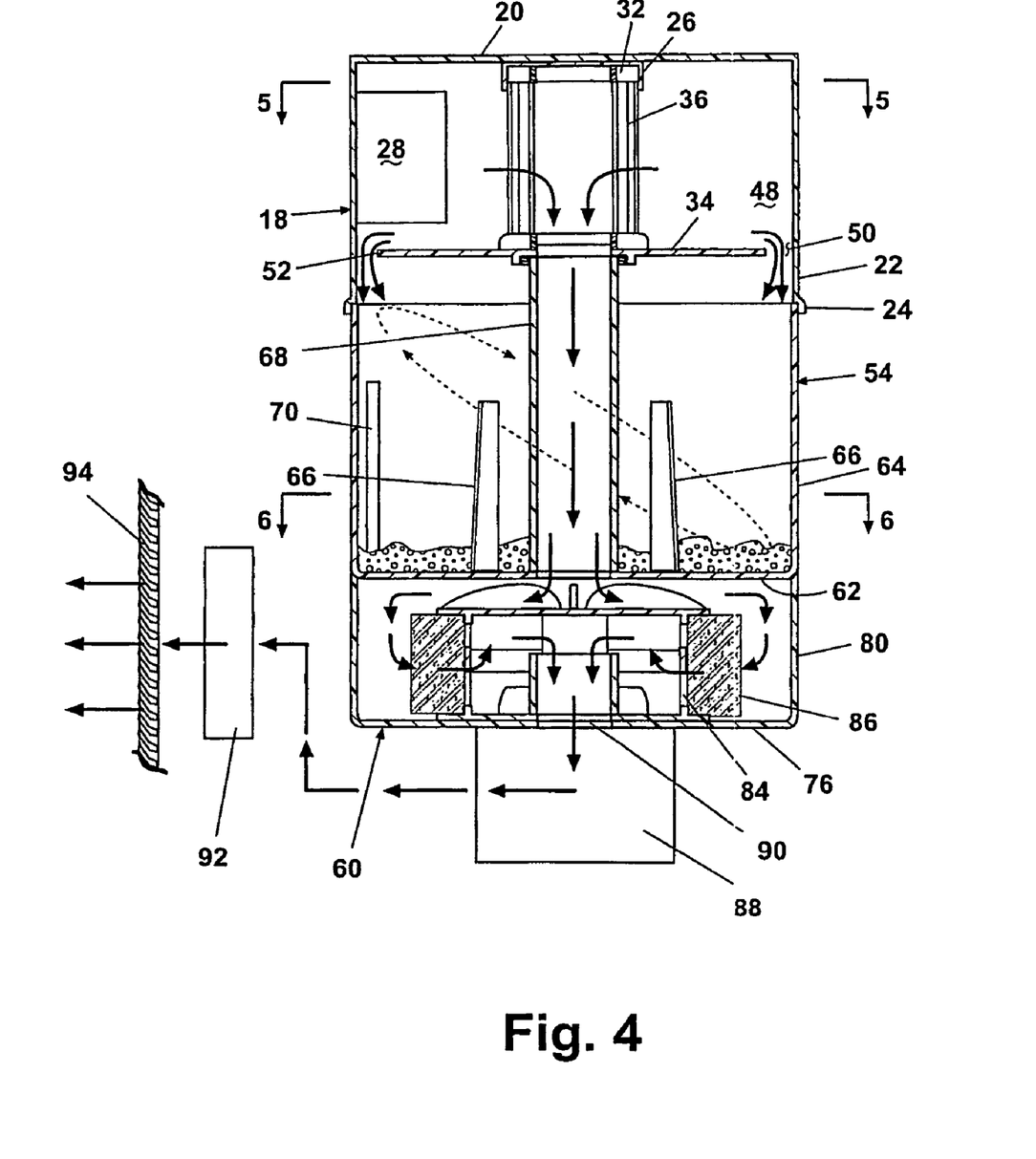
FIG. 4 is a front cross-sectional view of the cyclonic separator of FIGS. 1-2.

With further reference to FIGS. 2-6, the tangential airflow, containing particulate matter, passes through the tangential air inlet 28 and into the toroidal chamber 48 to travel around the exhaust assembly 30. As the airflow travels about the toroidal chamber 48, heavier dirt particles are forced toward the sidewall 22. These particles fall under the force of gravity through a gap 50 defined between an edge 52 of the separator plate 34 and the sidewall 22. Referring particularly to FIG. 4, dirt particles falling through the gap 50 drop through an open end of the separator 18 and are collected in a dirt cup and filter chamber assembly 54. The upper end of the dirt cup and filter chamber 54 is received in a nesting relationship in lower offset lip 24 of the sidewall 22 to seal the cyclone separator 18 to the dirt cup and filter chamber 54. The dirt cup and filter chamber 54 thereby performs the function of collecting the dirt separated from the airflow within the cyclone separator 18.

Figure 5:
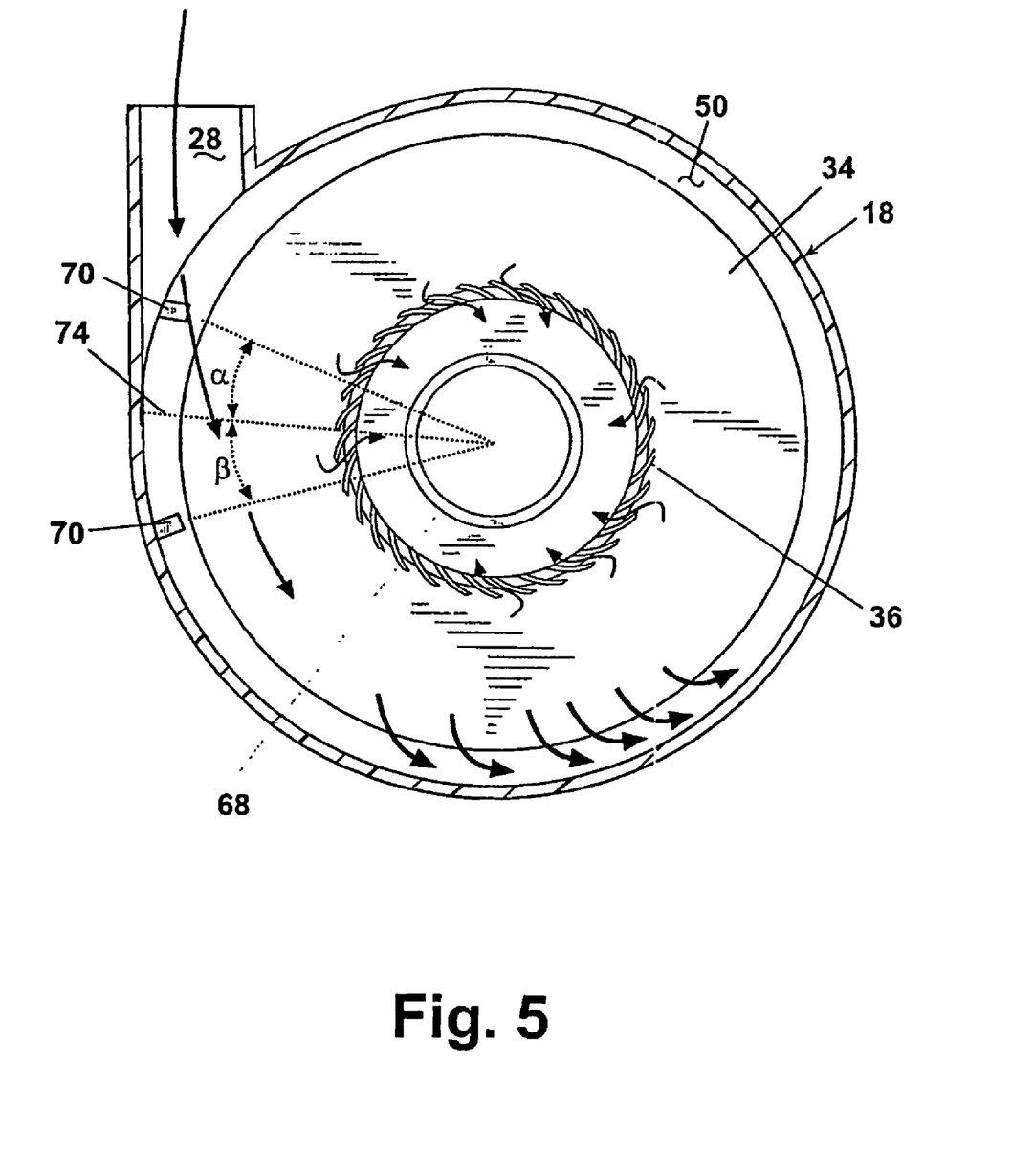
FIG. 5 is a cross-sectional view taken through line 5-5 of FIG. 4.
Figure 6:
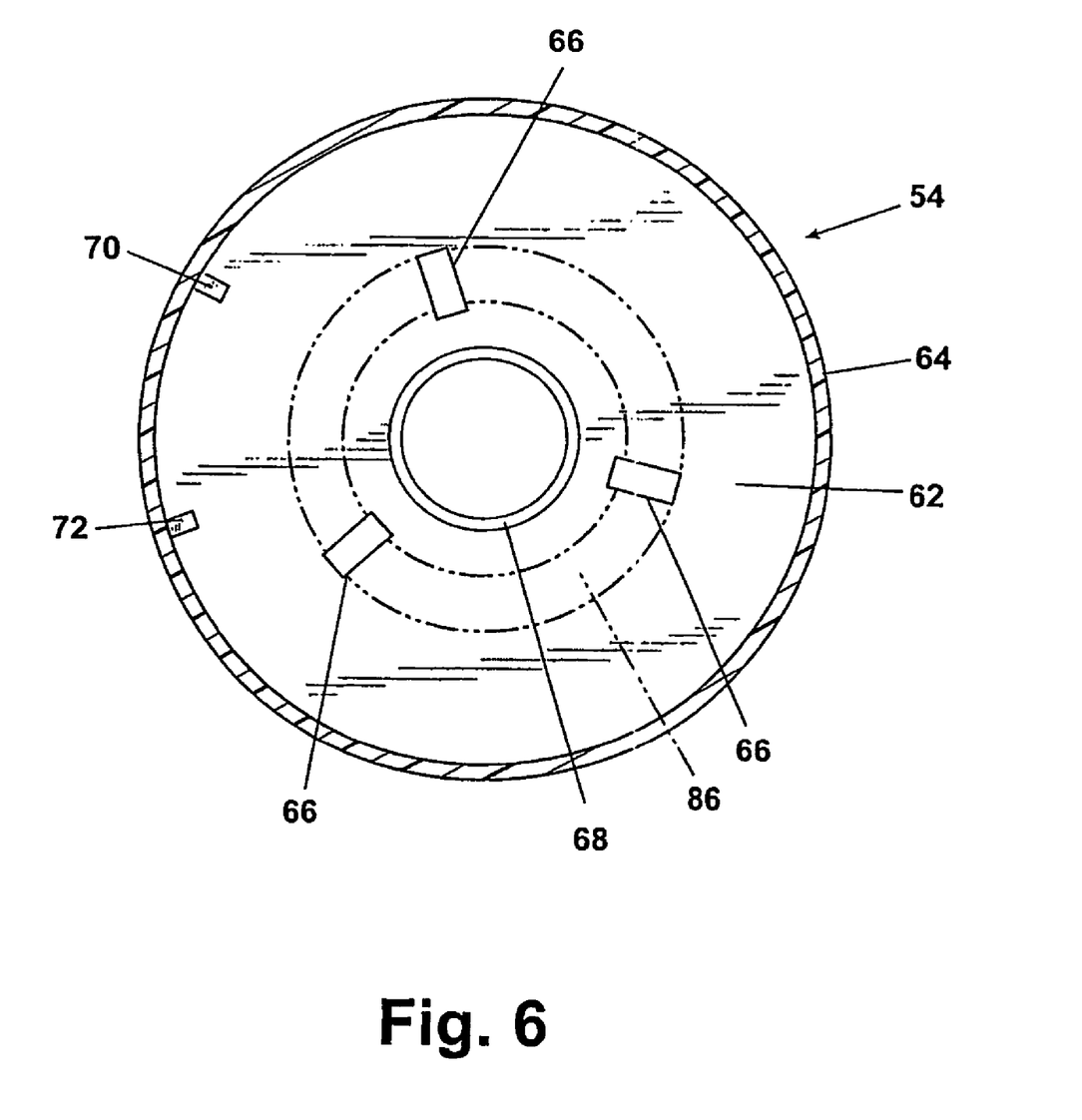
FIG. 6 is a cross-sectional view taken through line 6-6 of FIG. 4.

As the inlet air traverses through the toroidal chamber 48 casting dirt particles toward sidewall 22, the inlet air is drawn inwardly between the louvers 36. As seen in FIG. 5, the louvers 36 are oriented away from the direction of air flow (indicated by arrows) about the toroidal chamber 48. The velocity of the air flow is altered as the air flow changes direction to pass around and between the louvers 36. This change in the velocity of the air flow causes it to shed additional dirt particles. These dirt particles are urged toward the gap 50 by the circulating air flow in the cyclone separator 18.

Referring now to FIGS. 2-5, the dirt cup and filter chamber 54 comprises a pair of vertically oriented regions. The upper region comprises the dirt cup region 58 for collecting dirt as previously described and the lower chamber region comprises the filter chamber 60. The dirt cup region 58 is formed with a generally planar dirt cup bottom wall 62 and an upstanding cylindrical dirt cup sidewall 64 to form an open-topped receptacle. A plurality of upstanding prongs or fingers 66 project upwardly from the bottom wall 62. The fingers 66 can function in varying arrangements, but preferably the fingers 66 are arranged generally symmetrically about a hollow standpipe 68 concentric with the sidewall 64. The hollow standpipe 68 is fluidly connected to the exhaust assembly 30 through an opening in the separator plate 34 at a top end and a centrally located aperture in the dirt cup bottom wall 62 at a bottom end.

The hollow standpipe 68 is forms a conduit for exhaust of the filtered air stream from the exhaust assembly 30. The fingers 66 are found to function best when displaced at least some distance from the standpipe 68. Each of the fingers 66 are shown as being generally rectangular in plan view, having a long axis of its plan cross-section aligned with a radius of the circle. The fingers 66 can be of uniform cross-section from top to bottom, or can have a tapering cross-section as depicted in FIG. 4, wherein the fingers 66 are narrower at the top and wider at the base where they join the bottom wall 62. The fingers 66, as shown in the FIGS. 2-4, are approximately one half the height of the dirt cup region 58. Increasing the height of fingers 66 is preferred, but can be limited by production and tooling constraints and, as will be further described, the need to be able to detach dirt cup and filter chamber 54 from the cyclone separator 18. In an alternate embodiment, the fingers 66 can be attached to an outer surface of standpipe 68 and extend outwardly therefrom, terminating at some distance from the outer side wall 64.

The dirt cup region 58 further includes a pair of fins 70, 72 affixed to and contiguous with the sidewall 64. The fins 70, 72 are generally rectangular in cross section, in plan view, projecting inwardly from the sidewall 64 toward a center of dirt cup region 58. The distance that the fins 70, 72 project from the sidewall 64 can range from 2 to 10% of the radius, but is preferably 3 to 6% of the radius, and optimally 4% of the radius of the dirt cup region 58. The fins 70, 72 extend generally upwardly from the bottom wall 62 of the dirt cup region 58. In the preferred embodiment, the fins 70, 72 are perpendicular to the bottom wall 62 and extend approximately one-half of the height of the dirt cup region 58, although the fins 70, 72 can vary in height from 40 to 60% of the distance from bottom wall 62 to separator plate 34 and still be effective. Also in the preferred embodiment, the fins 70, 72 are generally aligned in the direction of inlet airflow entering the cyclone separator 18 through the air inlet 28. As shown in FIG. 2-4, the fins 70, 72 are arranged with respect to a radial plane 74 perpendicular to the tangential line that is in alignment with the inlet 28, with fin 70 angularly displaced from radial 74 by angle α and fin 72 displaced from radial 74 by angle β. These angles can vary over a range of about 30° to 60°, and preferably in the range of 40° to 50°. It has been found that a satisfactory placement of the fins results when the angle α is about 45° and the angle β is about 45°.

A known phenomenon in cyclone separators is the re-entrainment of dirt into the cyclonic airflow after it is apparently deposited in a dirt containment vessel positioned beneath the cyclone chamber. It has been discovered that this re-entrainment is due to the vertical component of air circulation within the dirt cup between the gap 50 at one side of the dirt-collecting bin and the bottom wall 62 at an opposite side of the dirt-collecting bin. Generally, the airflow pattern has the strongest component at the bottom portion of the dirt-collecting bin 560 below the inlet 152 to the cyclone chamber 550. This air circulation is shown in phantom lines in FIG. 4.

These vertical components of the air circulation are manifested in the "vacillating" of the dirt deposited within the dirt cup region 58. Disruption of, or a decrease in the magnitude of, these vertical components or vectors serves to minimize the re-entrainment of dirt in the cyclonic airflow and promotes agglomeration of the dirt in the dirt cup. Disruption of the airflow tends to agglomerate the dirt particles in the dirt cup region 58, forming clumps or balls unlikely to be re-entrained. It has been found that the fingers 66 and fins 70, 72 function in concert to inhibit the vacillation of the debris deposited in dirt cup region 58, disrupting the elliptical vectors that generate upward currents that would tend to carry the smaller dirt particles upwardly and back into the cyclonic air flow. The fingers 66 further deflect dirt particles within the dirt cup region 58 to further encourage agglomeration of the dirt particles. The fingers 70, 72 are generally arranged symmetrically about dirt cup region 58, but have been found to cooperate with fins 70, 72 optimally when none of fingers 66 are directly aligned with either of fins 70, 72.

Referring to FIGS. 2-4, the filter chamber region 60 further comprises a bottom wall 76 in spaced relation to the dirt cup bottom wall 62 and with a side wall 80. The bottom wall 62 further comprises a centrally located aperture that is in fluid communication with bottom portion of the standpipe 68. The bottom wall 76 further comprises an aperture 81 to removably receive a filter assembly 82. The filter assembly 82 further comprises a filter cage 84 which supports a cylindrical foam filter 86. The filter assembly mates with the bottom wall 76 via a ¼ turn bayonet fastener or any other suitable mechanical fastening means as previously described: As can be appreciated, air flow enters the filter chamber region 60 from the aperture 81 in bottom wall 62, passes through the foam filter 86 where particulate matter is captured, and continues on to an inlet 90 to a suction source 88. Optionally, the suction source exhaust may pass from an outlet opening in the suction source 88 through a final filter 92 before re-entering the atmosphere through a plurality motor exhaust louvers 94.

In an alternate embodiment, a commonly known cylindrical pleated filter (not shown) is attached to the filter cage 84 and the cylindrical foam filter 86 is positioned around the outer perimeter of the pleated filter to form a pair of concentric filter elements in series. In yet another embodiment, a single solid disc shaped foam filter (not shown) can be used in place of the cylindrical filters and the filter cage whereby the airflow enters the filter chamber region 60 and flows in a straight path directly through the disc shaped foam filter and into the motor inlet 90.

The dirt cup and filter chamber 54 is removably connected to the housing 12. The dirt cup and filter chamber 54 is generally vertically adjustable relative to the cyclone separator 18, such as by a cam mechanism, so that the dirt cup and filter chamber 54 can be raised into an engaged and operative position with the cyclone separator 18. The upper edge of the sidewall 64 is received within the offset lip 24, which prevents the dirt cup and filter chamber 54 from being dislodged from the cyclone separator 18. To remove the dirt cup and filter chamber from the cyclone separator 18, such as to discard accumulated dirt, the dirt cup and filter chamber is displaced downwardly from the cyclone separator 11. Once disengaged from the offset lip 24, the dirt cup and filter chamber 54 can be removed from the separator 18.

While the invention has been specifically described in connection with certain specific embodiments thereof, it is to be understood that this is by way of illustration and not of limitation. Reasonable variation and modification are possible within the forgoing disclosure and drawings without departing from the spirit of the invention which is defined in the appended claims.

What is claimed is:

1. A vacuum cleaner comprising:
   a housing defining a cyclonic airflow chamber for separating contaminants from a dirt-containing airstream, said housing further comprising a cyclonic chamber inlet and an airstream outlet in fluid communication with said cyclonic airflow chamber;
   a nozzle housing including a suction opening, said suction opening being fluidly connected with said cyclonic chamber inlet;
   an airstream suction source fluidly connected to said suction opening and to the cyclonic airflow chamber for transporting dirt-containing air from the suction opening to the cyclonic airflow chamber, said suction source is adapted to establish and maintain a dirt-containing airstream from said suction opening to and through said cyclonic chamber and through the airstream outlet;
   a dirt-collecting bin mounted to the housing adjacent said cyclonic airflow chamber and in communication therewith to receive dirt separated from the airstream in the cyclonic airflow chamber;
   a hollow standpipe extending through the dirt-collecting bin, in communication with the airstream outlet of the cyclonic airflow chamber and extending through a wall in the dirt collecting bin; and
   a filter chamber mounted to the dirt-collecting bin has an inlet opening in communication with the standpipe to remove fine particles from the airstream that passes through the airstream outlet in the cyclonic airflow chamber.

2. A vacuum cleaner according to claim 1 wherein the filter chamber and the dirt-collecting bin are removably mounted to the housing for selective removal therefrom.

3. A vacuum cleaner according to claim 2 wherein the filter chamber is integral with the dirt-collecting bin whereby both the dirt-collecting bin and filter chamber are selectively removable together from the housing.

4. A vacuum cleaner according to claim 1 and further comprising a separator plate between the cyclonic airflow chamber and the dirt-collecting bin and separating the cyclonic airflow chamber from the dirt-collecting bin, the separator plate having a diameter less than a diameter of the cyclonic airflow chamber adjacent the separator plate to thereby define a gap between the separator plate and the cyclonic airflow chamber for passage of dirt separated from the dirt-containing airstream in the cyclonic airflow chamber.

5. A vacuum cleaner according to claim 1 wherein the dirt-collecting bin is below the cyclonic airflow chamber.

6. A vacuum cleaner according to claim 1 wherein the dirt-collecting bin wall is positioned in a lower portion of the dirt-collecting bin.

7. A vacuum cleaner according to claim 1 wherein the standpipe is centrally located in the dirt-collecting bin.

8. A vacuum cleaner according to claim 1 wherein the airstream suction source is positioned in the housing below the filter chamber and has an inlet opening in communication with the filter chamber to draw the airstream through the filter chamber.

9. A vacuum cleaner according to claim 1 wherein the filter chamber includes a filter that is removably mounted within the filter chamber.

10. A vacuum cleaner according to claim 9 wherein the removable filter is cylindrical and the airstream passes radially through the cylindrical filter between the inlet opening in the filter chamber and an outlet opening in the filter chamber.

11. A vacuum cleaner according to claim 10 wherein the cylindrical filter comprises at least one of a foam filter and a pleated filter.

12. A vacuum cleaner according to claim 1 wherein the filter is cylindrical and the airstream passes through the cylindrical filter between the inlet opening in the filter chamber and an outlet opening in the filter chamber.

13. A vacuum cleaner according to claim 12 wherein the cylindrical filter is a foam filter.

14. A vacuum cleaner according to claim 13 wherein the airstream passes axially through the cylindrical filter between the inlet opening in the filter chamber and an outlet opening in the filter chamber.

15. A cyclone separator module comprising:
   a housing defining a cyclonic airflow chamber for separating contaminants from a dirt-containing airstream, said housing further comprising a cyclonic chamber inlet and an airstream outlet in fluid communication with said cyclonic airflow chamber;
   a dirt-collecting bin mounted to the housing adjacent said cyclonic airflow chamber and in communication therewith to receive dirt separated from the airstream in the cyclonic airflow chamber;
   a hollow standpipe extending through the dirt-collecting bin, in communication with the airstream outlet of the cyclonic airflow chamber and extending through a wall in the dirt collecting bin; and
   a filter chamber mounted to the dirt-collecting bin including an inlet opening in communication with the standpipe to remove fine particles from the airstream that passes through the airstream outlet in the cyclonic airflow chamber.

16. A cyclone separator module according to claim 15 wherein the filter chamber and the dirt-collecting bin are removably mounted to the housing for selective removal therefrom.

17. A cyclone separator module according to claim 16 wherein the filter chamber is integral with the dirt-collecting bin whereby both the dirt-collecting bin and filter chamber are selectively removable together from the housing.

18. A cyclone separator module according to claim 15 and further comprising a separator plate between the cyclonic airflow chamber and the dirt-collecting bin and separating the cyclonic airflow chamber from the dirt-collecting bin, the separator plate having a diameter less than a diameter of the cyclonic airflow chamber adjacent the separator plate to thereby define a gap between the separator plate and the cyclonic airflow chamber for passage of dirt separated from the dirt-containing airstream in the cyclonic airflow chamber.

19. A cyclone separator module according to claim 15 wherein the dirt-collecting bin is below the cyclonic airflow chamber.

20. A cyclone separator module according to claim 15 wherein the dirt-collecting bin wall is positioned in a lower portion of the dirt-collecting bin.

21. A cyclone separator module according to claim 15 wherein the standpipe is centrally located in the dirt-collecting bin.

22. A cyclone separator module according to claim 15 wherein the filter chamber has an outlet opening adapted to be in communication with a suction source.

23. A cyclone separator module according to claim 15 wherein the filter chamber includes a filter that is removably mounted within the filter chamber.

24. A cyclone separator module according to claim 15 wherein the removable filter is cylindrical and the airstream passes radially through the cylindrical filter between the inlet opening in the filter chamber and an outlet opening in the filter chamber.

25. A cyclone separator module according to claim 24 wherein the cylindrical filter comprises at least one of a foam filter and a pleated filter.

26. A cyclone separator module according to claim 15 wherein the filter is cylindrical and the airstream passes through the cylindrical filter between the inlet opening in the filter chamber and an outlet opening in the filter chamber.

27. A cyclone separator module according to claim 26 wherein the cylindrical filter is a foam filter.

28. A cyclone separator module according to claim 27 wherein the airstream passes axially through the cylindrical filter between the inlet opening in the filter chamber and an outlet opening in the filter chamber.

* * * * *